W. S. HARLEY.
BEARING.
APPLICATION FILED MAR. 8, 1913.
1,103,044.
Patented July 14, 1914.
2 SHEETS—SHEET 1.
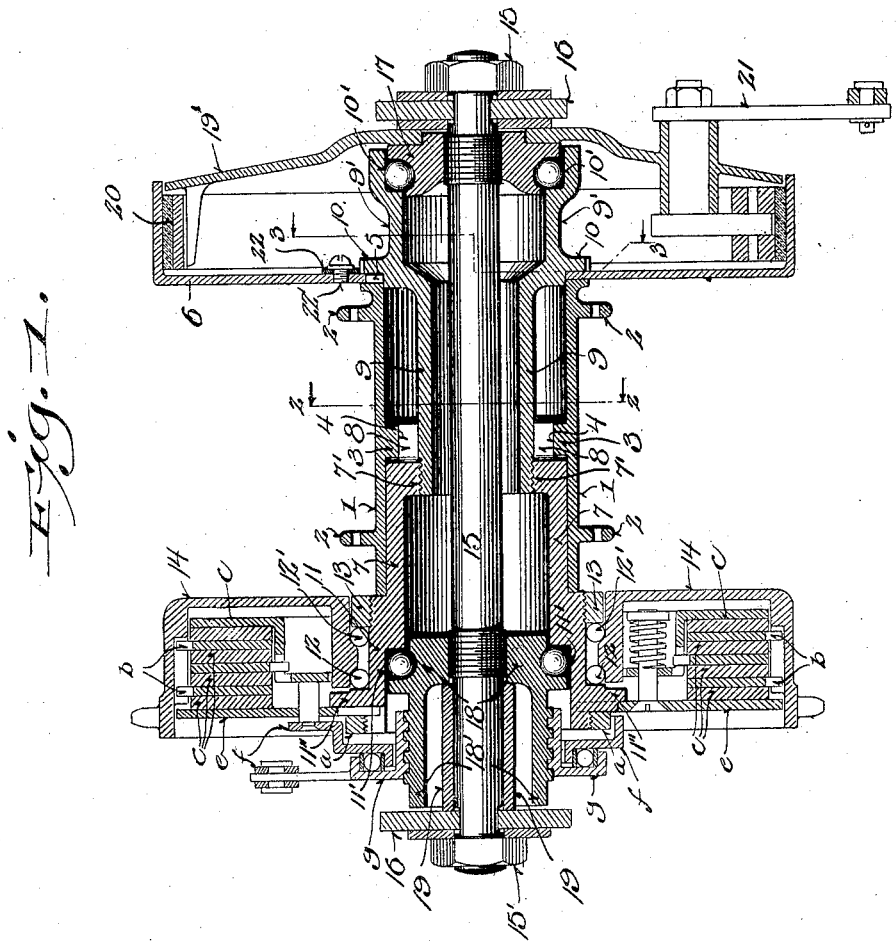

W. S. HARLEY.
BEARING.
APPLICATION FILED MAR. 8, 1913.
1,103,044.
Patented July 14, 1914.
2 SHEETS—SHEET 2.
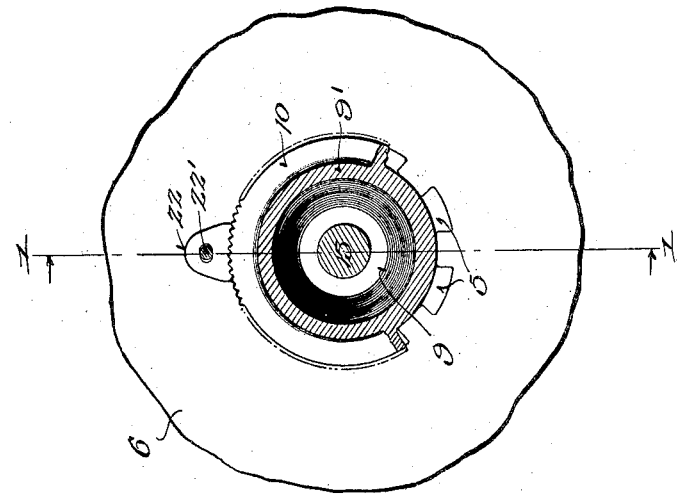
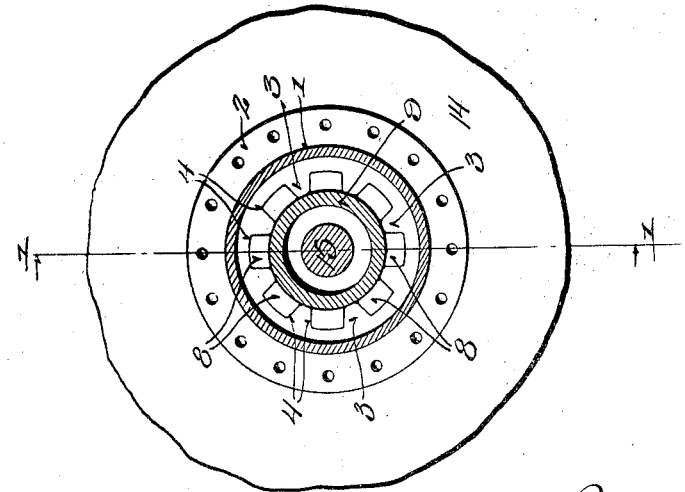

UNITED STATES PATENT OFFICE.

WILLIAM S. HARLEY, OF MILWAUKEE, WISCONSIN.

BEARING.

1,103,044. Specification of Letters Patent. Patented July 14, 1914.

Application filed March 8, 1913. Serial No. 752,966.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Bearings; and I do hereby declare that the following is a full, clear, and exact description thereof.

The object of my invention is to provide a simple, economical and effective wheelhub, the same being particularly devised for use in the construction of a drive-wheel for a motorcycle.

In a general way the construction and arrangement of the hub is such that it is formed from three parts that can be cheaply constructed and assembled and when so assembled they form a rigid shell provided with ball-races and means for attaching the various mechanical controlling elements with which such hubs are usually equipped.

With the above objects in view the invention consists in certain peculiarities of construction and combination of parts as hereinafter set forth with reference to the accompanying drawings and subsequently claimed.

In the drawings Figure 1 represents a longitudinal sectional view of a hub embodying the features of my invention, the same being shown with a band-brake attachment and clutch-connected driving wheel, which attachments form no part of my present invention; Fig. 2, a cross-section of the hub, the section being indicated by line 2—2 of Fig. 1, and Fig. 3, another cross-section of the hub, which section is indicated by line 3—3 of Fig. 1.

Referring by characters to the drawings, 1 represents a hub-barrel provided with the usual spoke-retaining flanges 2, and a centrally disposed internal web 3 which web is internally interrupted to form serrations 4, as shown in Fig. 2. One end face of the barrel is provided with a series of raised sectors 5 for interlocking engagement with correspondingly shaped recesses that are formed in the circular aperture of a disk 6, which disk in this instance constitutes the web portion of a brake wheel. The opposite end of the barrel 1 is arranged to receive a ball-cup bushing 7 which is exteriorly shouldered for abutting engagement with the barrel end, whereby inward movement of the bushing is limited. The inner end of the bushing 7 is provided with longitudinally disposed projections or teeth 8 for interlocking engagement with the web serrations 4, whereby the bushing and barrel are rotatably engaged. In order to lock the barrel and bushing 7 together in a longitudinal direction, a ball-cup sleeve 9 is provided having its inner end threaded for engagement with a correspondingly threaded aperture 7′ that is formed in the end of the cup-bushing 7. The sleeve 9 is formed with an enlarged hollow head 9′ having a circular flange 10 which extends therefrom, the flange being annularly serrated or knurled, as best shown in Fig. 3. This flange 10 is designed to abut the interlocked barrel sectors 5 and adjacent face of the disk 6. Hence when the sleeve is firmly seated it will effect a draw between the shoulder of the bushing 7 and sleeve flange 10 whereby the disk and barrel are firmly pinched between the bushing shoulder and sleeve flange 10. The head 9′ of the sleeve 9 terminates with an internal ball-race 10′ and the bushing 7 is also provided with a hollow head 11 that projects beyond the barrel, which head has a similar internal ball-race 11′. The projecting head 11 of the bushing 7 terminates with an end flange 11″ against which flange and the circumferential face of said head is adjusted a series of anti-friction balls 12, a corresponding series of balls 12′ being spaced therefrom about the face of the head and are retained by a ring 13, which ring is in threaded union with the aforesaid head, as best shown in Fig. 1. These sets of balls constitute journals for a loosely mounted shell-like driving wheel 14 that, in this instance, is shown in the form of a sprocket. The said wheel forms no part of my invention, and is adapted to be locked and released from the hub-member by a friction clutch mechanism such as shown and described in a patent issued to me March 12, 1912, No. 1020199. This clutch mechanism in a general way comprises sets of friction disks *b* that are carried by the drive-wheel 14 and arranged to be engaged by a second set of disks *c*, which disks are carried by a face-plate *e*. The disks are normally held together under spring tension and are spread by longitudinal movement of a plate *f*, which plate is controlled by a manually operated nut *g*.

15 indicates a non-rotary axle about which the hub-member is mounted the said axle being secured in keeper-webs 16 that constitute part of the rear fork of a motorcycle frame (not shown). Mounted upon a threaded section of the axle adjacent to the end of the sleeve 9 is a cone 17, there being a similar threaded section at the opposite end of the axle for threaded engagement with a second cone 18, which cone is provided with an exteriorly threaded hollow hub 18' that terminates adjacent to the keeper-web. Between the adjacent keeper-web 16 and one face of the cone 18 is a spacing-thimble 19, which thimble surrounds the axle and serves to lock the cone and its hub against rotation, the lock being effected by a nut 15' which is in threaded union with the end of the axle and thus serves to frictionally bind said parts. This cone 18 is fitted with the usual anti-friction balls that also engage the ball-race 11' of the bushing. The opposite cone 17 is similarly provided with a series of anti-friction balls which are engaged by the ball-race 10', of the sleeve head 9'. The cone 17 is provided with a squared shoulder upon which is fitted the squared aperture of a cover-plate 19' that forms a housing in conjunction with the band-brake wheel for an expansible band 20, which band is arranged to be contracted and expanded with relation to the brake-wheel by a manually controlled crank 21 that is connected to one end of the band, it being understood that said band-brake mechanism forms no part of my present invention.

Between the cover-plate 19 and adjacent keeper-web 16 is a suitable washer and said cover-plate together with the cone 17 is held against movement, after being set, by a retaining nut 15", which nut engages the end of the axle and thus serves to draw the said parts firmly in frictional contact with the web 16 referred to.

In order to hold the sleeve 9 against rotation after the parts have been assembled, I provide a serrated locking-dog 22, which dog is secured to the band-brake disk 6 by a retaining screw 22'. Said retaining screw is passed through an aperture in the dog, which aperture is of sufficient area to permit slight movement of said dog, whereby its serrations may be brought into meshed engagement with the serrations of the sleeve flange 10. Thus said sleeve, after being adjusted, is locked.

The manually operated nut $g$, which controls the friction clutch mechanism referred to, is mounted upon the threaded hub 18' of the ball-cone 18 and hence it is apparent when the nut is moved in one direction the driving wheel is free to rotate upon its bearings, while movement in the opposite direction of the nut will cause the clutch disks to effect a locking engagement between the hub and said drive-wheel, it being apparent by referring to Fig. 1 that the face-plate $e$ is secured to the head of the bushing 7 by a spanner-nut $a$ which is in threaded union with a correspondingly threaded end of said head to thus force the face-plate against the head flange 11".

From the foregoing description it is manifest that the three units constituting the hub as a whole can be economically manufactured and assembled to form a rigid durable hub, it being understood that said hub may be used in connection with any form of brake or free-wheel clutch mechanism.

I claim:

1. A wheel-hub comprising a barrel having internal locking means, a ball-cup bushing fitted within one end of the barrel having a threaded aperture at its inner end, means extending from the inner end of the bushing for engagement with the barrel locking means, a flanged ball-cup sleeve fitted into the opposite end of said barrel having a threaded inner end in engagement with the threaded aperture of the bushing, the sleeve flange being adapted to impinge against the adjacent end of the aforesaid barrel whereby the several parts are drawn together to constitute a unitary assemblage.

2. A wheel-hub comprising a barrel having an internal web, a ball-cup bushing fitted into one end of the barrel having a threaded aperture at its inner end, an interlocking connection between the inner end of the bushing and barrel web, and a flanged ball-cup sleeve fitted into the opposite end of the barrel having a threaded inner end in engagement with the threaded aperture of the bushing.

3. A wheel-hub comprising a barrel having an internal web provided with notches, a ball-cup bushing fitted into one end of the barrel having a threaded aperture at its inner end, teeth extending from the said inner end of the bushing in interlocking engagement with the web notches, and a flanged ball-cup sleeve fitted into the opposite end of the barrel having a threaded inner end in engagement with the threaded aperture of the bushing.

In testimony that I claim the foregoing I have hereunto set my hand at Milwaukee, in the county of Milwaukee and State of Wisconsin in the presence of two witnesses.

WILLIAM S. HARLEY.

Witnesses:
   EDWIN F. CASPER,
   E. J. MUELLER.